(12) United States Patent
Lee

(10) Patent No.: US 7,652,657 B2
(45) Date of Patent: Jan. 26, 2010

(54) METHOD AND SYSTEM FOR DETERMINING CHARACTERISTICS OF OPTICAL SIGNALS ON SPATIAL LIGHT MODULATOR SURFACES

(75) Inventor: Benjamin Lowell Lee, Duncanville, TX (US)

(73) Assignee: Texas Instruments Incorporated, Dallas, TX (US)

(*) Notice: Subject to any disclaimer, the term of this patent is extended or adjusted under 35 U.S.C. 154(b) by 575 days.

(21) Appl. No.: 11/610,394

(22) Filed: Dec. 13, 2006

(65) Prior Publication Data

US 2007/0080893 A1 Apr. 12, 2007

Related U.S. Application Data

(62) Division of application No. 10/449,793, filed on May 30, 2003, now Pat. No. 7,167,143.

(51) Int. Cl.
*G09G 3/34* (2006.01)

(52) U.S. Cl. .................. 345/108; 345/30; 345/32; 345/107

(58) Field of Classification Search ............. 345/30–56, 345/104–111; 356/489–498
See application file for complete search history.

(56) References Cited

U.S. PATENT DOCUMENTS

| | | | |
|---|---|---|---|
| 6,654,516 B2 | 11/2003 | So | |
| 6,842,549 B2 | 1/2005 | So | |
| 6,943,950 B2 | 9/2005 | Lee et al. | |
| 6,965,470 B2 | 11/2005 | So | |
| 7,167,143 B2 * | 1/2007 | Lee ........................ | 345/30 |
| 2003/0090783 A1 | 5/2003 | So | |
| 2003/0231365 A1 | 12/2003 | So | |
| 2004/0047632 A1 | 3/2004 | Powell | |
| 2006/0007546 A1 | 1/2006 | Lee et al. | |

* cited by examiner

*Primary Examiner*—Vijay Shankar
(74) *Attorney, Agent, or Firm*—Dawn V. Stephens; Wade James Brady, III; Frederick J. Telecky, Jr.

(57) ABSTRACT

The present application describes a system and method for determining characteristics (e.g., exact band location, orientation and height and the spot shape and size of a single wavelength and the like) of an optical signal projected on a spatial light modulator. In an embodiment, images with sharper edges (i.e. clear boundary between 'on' pixels and 'off' pixels) on the spatial light modulator are used to obtain spectral information from a referenced broadband source. The spectral information can be used to determine the desired characteristics of optical signals projected on the spatial light modulator.

32 Claims, 4 Drawing Sheets

METHOD AND SYSTEM FOR DETERMINING CHARACTERISTICS OF OPTICAL SIGNALS ON SPATIAL LIGHT MODULATOR SURFACES

This application is a divisional of application Ser. No. 10/449,793, filed May 30, 2003.

TECHNICAL FIELD

The present application describes systems and methods for determining characteristics of optical signals in digital mirror systems, and specific embodiments for determining band location, orientation, and height and spot size of optical signals.

BACKGROUND

A pixel-based Spatial Light Modulator ("SLM") can be used to modulate an incoming optical signal. SLMs can be used in many contexts, such as in projection displays, printing, telecommunications, and in other types of optical signal processing. In a telecommunications context, an incoming optical signal can have multiple different channels or carrier wavelengths. Assembly variations of optical signal processing systems result in statistical variation of the characteristics, such as band location, orientation, and wavelength spot height, size and shape, of the optical signal on the surface of display systems. To accurately apply attenuation algorithms to optical signals, the characteristics of a single wavelength (e.g., band location, orientation, and single wavelength height, spot shape, and size) must be determined. It is further advantageous to determine this information after the assembly of optical signal processing systems is complete to calibrate the optical signal processing systems.

Typically, a significant amount of power data collection and analysis is required to determine the characteristics of an optical signal. The power data collection and analysis consumes the significant amount of time and sometimes leads to inaccurate determination of optical signal characteristics. Accordingly, a system and method is needed for efficient and real-time determination of optical signal characteristics

SUMMARY

The present application describes a system and method for determining characteristics of an optical signal projected on a spatial light modulator. In an embodiment, images with sharper edges or a clear boundary between "on" pixels and "off" pixels on the spatial light modulator are used to obtain spectral information from a referenced broadband source. The spectral information can be used to determine certain characteristics of optical signals projected on the spatial light modulator.

In some embodiments, the present application describes a method for determining one or more of location and orientation of an optical signal band projected on a spatial light modulator, where the spatial light modulator includes a plurality of pixels and the optical signal band includes one or more wavelengths. The method includes measuring a first output of the spatial light modulator, selectively turning off one or more groups of pixels, measuring a second output of the spatial light modulator, and determining the location and orientation of the optical signal band by comparing the first output with the second output corresponding.

In some variations, the method includes determining spot sizes of the wavelengths using the location and orientation of the optical signal band. The optical signal band may be dispersed by a grating, and the first output of the spatial light modulator may be measured with substantially all of the pixels of the plurality of pixels being turned on. The spatial light modulator may be a Digital Micromirror Device ("DM") or other type of SLM. In some variations, one or more groups of pixels are selected using a binary search algorithm. The optical signal band may be projected at an angle of forty-five degrees relative to the rows and columns of pixels of the spatial light modulator.

In some variations, the groups of pixels are one or more horizontal bars of pixels that are turned off on the spatial light modulator. In some embodiments, the one or more horizontal bars of pixels that are turned off comprise the edges of the optical signal band within which substantially all the pixels are turned on. In some variations, a first edge is within the proximity of a first wavelength of the optical signal band and a second edge is within the proximity of a last wavelength of the optical signal band.

In some embodiments, the groups of pixels form one or more vertical bars of pixels that are turned off on the spatial light modulator. In some variations, the one or more vertical bars of pixels that are turned off comprise the edges of the optical signal band within which substantially all the pixels corresponding to the optical signal band are turned on. In some embodiments, a first edge is within the proximity of a first wavelength of the optical signal band and a second edge is within the proximity of a last wavelength of the optical signal band.

The selected groups of pixels may form one or more diagonal bars of pixels that are turned off on the spatial light modulator. In some embodiments, the diagonal bars of pixels that are turned off represent at least two edges of the optical signal band within which substantially all the pixels corresponding to the optical signal band are turned on. In some variations, a first edge is within the proximity of a first wavelength of the optical signal band and a second edge is within the proximity of a last wavelength of the optical signal band.

The system may include an optical signal processor coupled to the spatial light modulator. The optical signal processor may be configured to perform the methods describe above and elsewhere in this specification.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The embodiments of the present invention may be better understood, and its numerous objects, features, and advantages made apparent to those skilled in the art by referencing the accompanying drawings.

Figure 1:
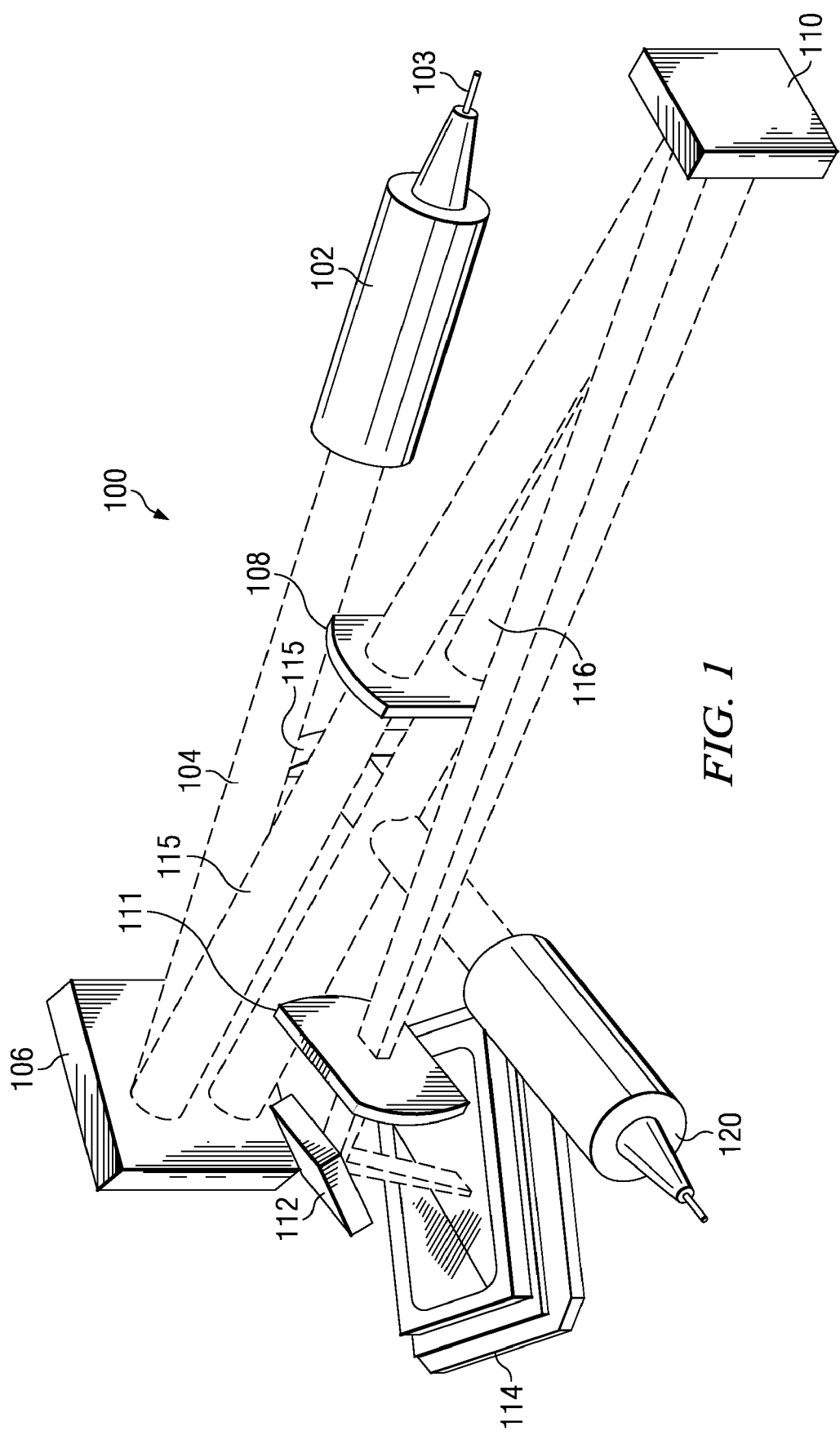
FIG. 1 is a perspective view of an optical system that can be used to determine the characteristics of an optical system.

All of these drawings are drawings of certain embodiments. The scope of the claims is not to be limited to the specific embodiments illustrated in the drawings and described below.

DETAILED DESCRIPTION OF THE EMBODIMENTS

FIG. 1 is a perspective view of the components of an optical signal processing system 100 that can be used to determine the characteristics of optical signals on spatial light modulator surfaces according to an embodiment of the present invention. The functions of spatial light modulators are described in a commonly owned U.S. patent application entitled "Generation of Digital Patterns for Spatial Light Modulation," Ser. No. 10/154,257, filed May 23, 2002, which is incorporated herein by reference in its entirety for all purposes. An input light collimator 102 receives an optical light signal input on optical fiber 103. A free-space optical signal 104 enters the system 100 via input light collimator 102. The optical signal can have N channels, each of which can have a separate wavelength "$\lambda$" ($\lambda_1, \lambda_2 \ldots \lambda_n$). The free-space optical signal 104 is directed towards a grating 106, which spatially separates optical channels slightly so that they will travel along slightly diverging optical paths. These diverging optical paths pass through an imaging lens 108, which focuses the optical signals onto the DMD 114.

The path between the lens 108 and the DMD 114 can include a mirror 110 for reflecting the optical signal 104 back generally towards the direction of origin of the signal. A correction lens 111 can be used to adjust the optical signal 104 in case where the grating is not at the first focal point of the imaging lens 108. The correction lens 111 allows the path length from the grating 106 to the imaging lens 108 to be different from the focal length of the lens 108. A folding mirror 112 directs the optical signal onto the DMD 114. Because of the separation of channels provided by the grating 106, each channel falls on a slightly different portion of the DMD 114 surface. The DMD 114 reflects the light beam back towards the mirror 112, but the mirrors of the DMD 114 modulate the incoming light signal such that the DMD 114 acts as an optical signal processor. This optical signal processing could be, for example, optical attenuation, wavelength filtering, optical performance monitoring, co-channel modulation, dispersion compensation and the like. In systems employing multiple ports, the optical signal processor can be employed as an add/drop multiplexer. Another purpose for the optical signal processing performed by the DMD 114 could be to provide a programmable optical source, such can be formed from a wide-band optical laser whose input is filtered down to make it appear as if it were one or more sources of narrow-band light.

After reflection from the DMD 114 surface and the mirror 112, the optical signals return through the mirror 110 and the imaging lens 108. Although the return path 116 of the reflected optical signal path is similar to the path for the incoming light beam 104, it is slightly spatially separated, such that when the beam strikes the grating 106 again on the return path, it is spatially offset from the position where it struck the grating 106 as the incoming optical signal 104. The optical grating 106 thereupon re-converges the multiple channels, and directs them towards a mirror 115, which is also separated from the incoming beam 104, but is in line with the return beam 116. From mirror 115, the reflected light beam 116 is directed towards an output of the system, which is preferably also a collimator 120.

The structure of the optical system of FIG. 1 is just an example of an optical system in which the embodiments discussed in this application can be applied. For example, in the application shown in the FIG. 1, the incoming light signal 104 is reflected from the DMD 114 in a manner such that the reflected light signal 116 does not travel along the same path as the incoming light signal 104. In some applications, it may be desirable to direct the reflected beam back along the same path and use a circulator to separate the incoming and outgoing beam. Other embodiments and variations from the embodiment of FIG. 1 can be developed that will still fall within the scope of the claims.

Data Collection

Figure 2A:
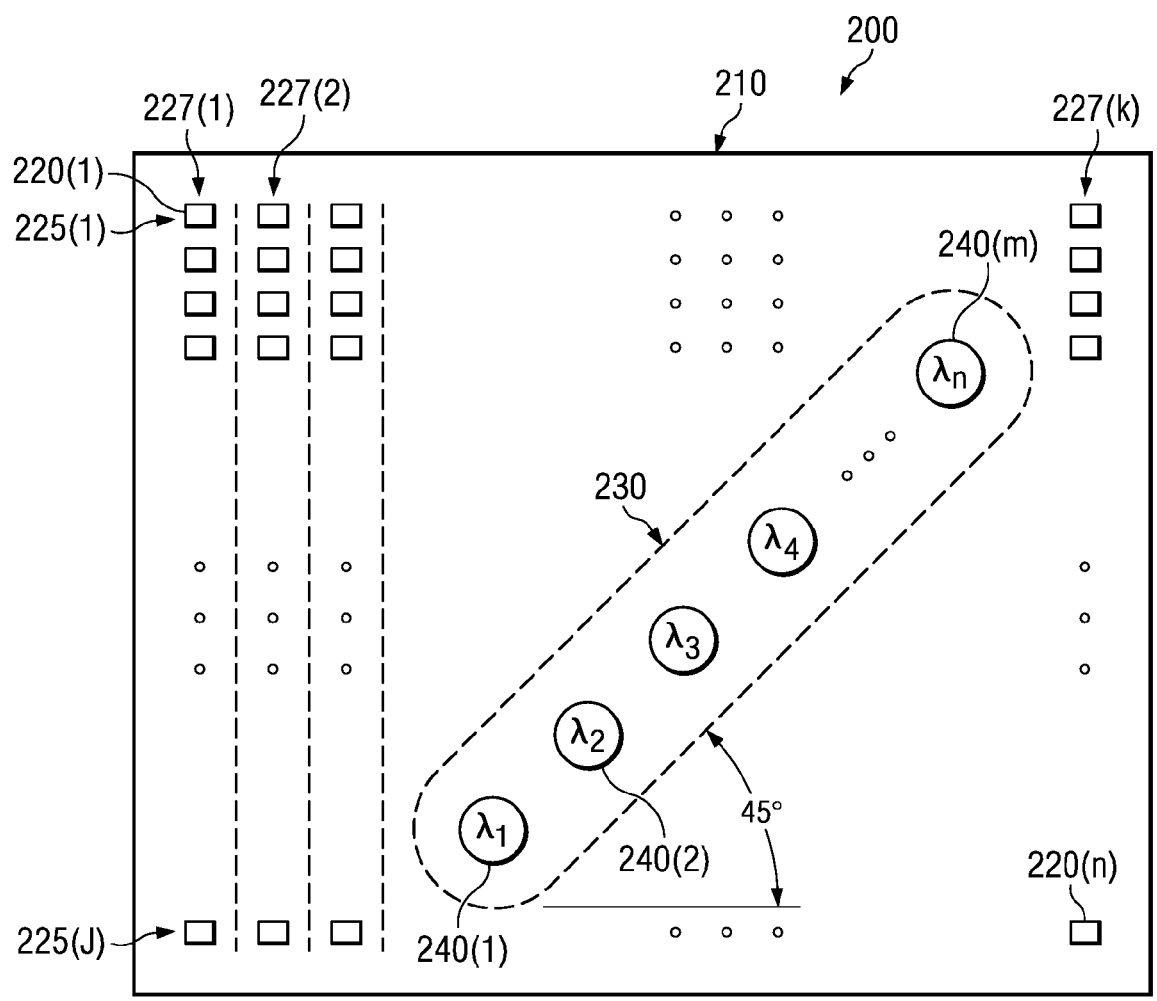
FIG. 2A illustrates a system for collecting spectral data using a reference broadband source.

FIG. 2A illustrates a system 200 for collecting spectral data using a reference optical source according to an embodiment of the present invention. System 200 includes a DMD 210. The DMD 210 includes N mirrors 220(1)-(N) organized in a J×K matrix of 225(1)-(J) rows and 227(1)-(K) columns. The reference optical signal band 230 with known characteristics is projected on the DMD 210 from a continuous spectrum reference source using a system such as shown and described in the FIG. 1. For purposes of illustrations, in the present example, the reference source is set to at least 6 dB above the resolvable floor. The optical signal band 230 includes N wavelengths, $\lambda_1$-$\lambda_n$. Each wavelength is spatially separated, for example by using a grating 106.

To measure the data for each wavelength individually, the optical signal band 230 is projected at an angle of approximately +/−45 degrees relative to the rows and columns of mirrors 220 of the DMD 210. The direction of dispersion of the optical signal band 230 is known, for example because the location of shortest wavelength may be known. Further, in the present example, the wavelength peaks of the optical signal band 230 vary linearly as a function of position of the optical signal band 230 on the DMD 210. Different reference bands can be used to collect spectral data for example, various different readings can be obtained using bands at different angle and the bands can include any number of wavelengths. This collected data may then be applied to the operation of the system with optical signals bearing display or communication data. The mirrors of the DMD 210 reflect the optical signal band 230 in the direction of a predetermined system output such as collimator 120. Because the dispersion of the reference optical signal band 230 is known, the mirrors of the DMD 210 can be selectively controlled (e.g., turned "on" and "off") to collect data for each wavelength.

Figure 2B:
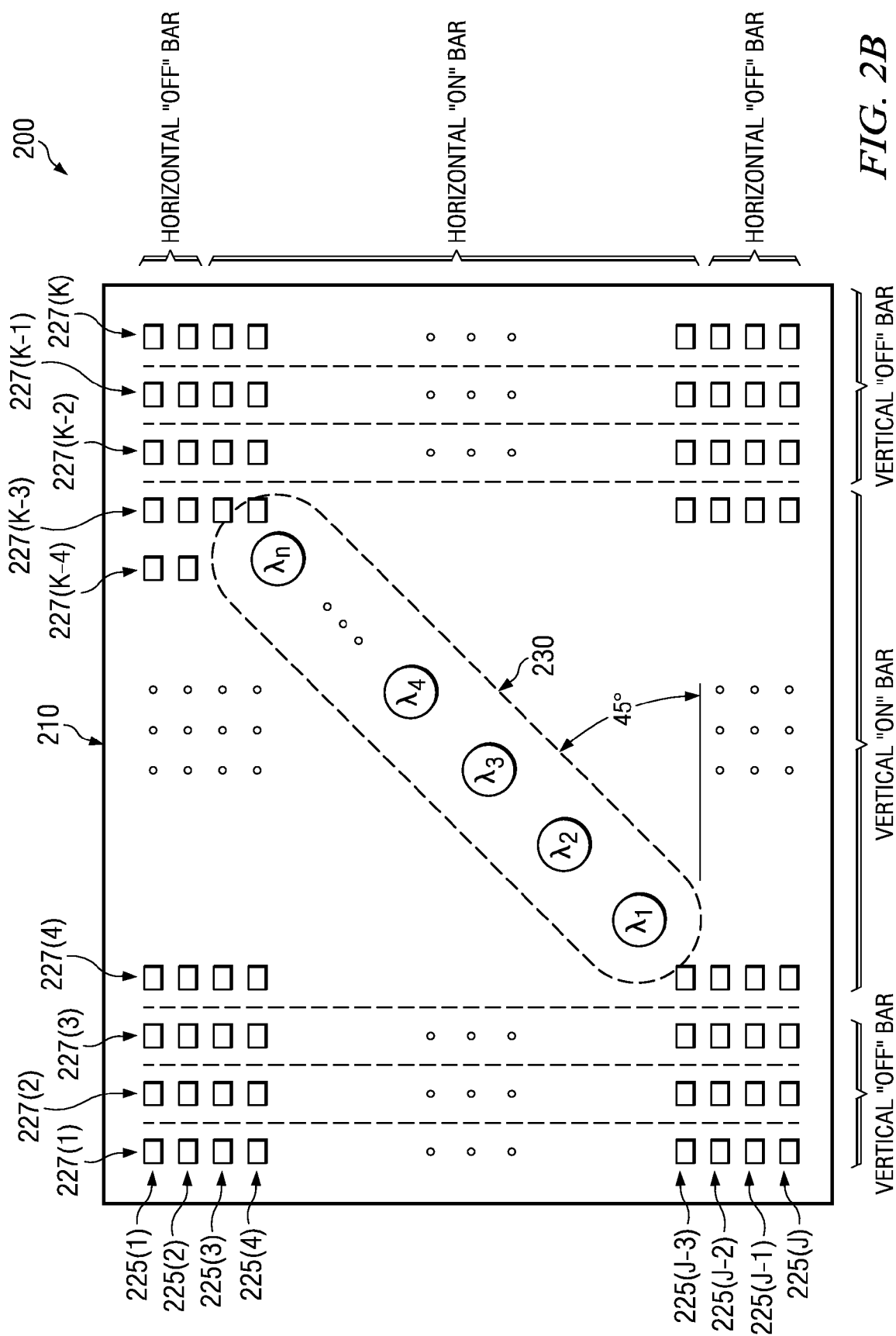
FIG. 2B illustrates an example of spectral data collection for the reference band.

FIG. 2B illustrates an example of spectral data collection for the reference band according to an embodiment of the present invention. In the present example, the spectral data for the reference band is collected by selectively turning the mirrors "on" and "off" on the DMD. The mirrors on DMD 210 can be turned on or off using various combinations. In the present example, the mirrors are turned "on" or "off" using various rows and columns. For example, for a horizontal reading, the rows of mirrors on DMD 210 can be selected such that when a horizontal bar of the mirrors is turned "on," both the edges of the horizontal bar fall within the proximity of the first and the last wavelength spots of the optical signal band 230. For example, in the present example, the mirror rows 225(3) and 225(J-3) fall within the optical signal band 230 but near wavelengths $\lambda_n$ and $\lambda_1$ respectively. Thus, all the rows between and including 225(3)-225(J-3) can be turned on/off for horizontal signal measurement. Similarly, for vertical signal measurement, a vertical bar can be formed using the mirror columns between and including columns 227(4) and 227(K-3) by turning these mirrors on/off.

By turning off the mirror rows and columns, the optical signal band 230 can be "sliced" to introduce sharp edges or on/off boundaries in its projection on the surface of DMD 210. Because the DMDs, for example, may include a large number of mirrors (e.g., millions in some cases) and other spatial light modulators may include a similar number of pixels, it can be a challenge to determine which rows and columns to include in the horizontal/vertical bars for output measurement. Various search mechanisms can be used to locate appropriate rows and columns for the sharp edges. For example, a binary search algorithm can be used to reduce the amount of time required to select the sharp edges that fall within the band 230 and near the final wavelength spots on each end of the band 230. Knowing the characteristics of the optical signal band 230, the signal measured at the output using on/off bars of selective mirrors can be compared against the signal measured without the bars to determine the exact band location, band orientation and height, and spot shapes and sizes of a individual wavelength spots. The data collected by the optical processing system can be processed by one or more computing systems coupled to the optical processing system 100 to determine the desired characteristics of the optical signal band 230 using the calculation methods described herein.

Band Location and Orientation Calculation

The information about the band location and orientation can be determined by introducing an edge on the DMD 210 that cuts across the image of a broadband source dispersed by the grating 106. Generally, when a known reference band 230 is projected on the DMD 210, the spot size, shape and orientation of each λ is the same. The power envelope of the spot is a generalized 2D "Gaussoid" or an elliptic 2D Gaussian shape. Typically, this is due to the fact that when an optical signal travels through a collimator, such as collimator 102, the output from the collimator is initially a circular 2D Gaussoid. However, when the optical signal traverses the grating and is focused by various focusing optics, its shape may become elliptic. Further, the radii of the Gaussoid are generally perpendicular and parallel to the dispersion direction.

In the present example, a continuous spectrum reference optical source (e.g., a source that is at least 6 dB above the resolvable floor) is used. In one embodiment, the reference source is at least 10 dB above the resolvable floor. In the given example, the wavelength peaks of the diffracted reference optical source vary linearly as a function of position on the DMD 210 surface. The reference optical source band 230 is used at an angle of approximately ±45° to the rows and columns of mirror 220 of the DMD 210. The direction of dispersion may be known or can be determined. If the band is vertical or horizontal with respect to the DMD 210 surface, then the 'edges' using the mirrors of the DMD 210 can be introduced at ±45° instead. The greatest diffractive extinction ratio from an "on" state to an "off" state of the mirrors can be achieved at 45 degrees to the pixel edges. Because the reference optical band is at an angle of 45 degrees, the mirrors of the DMD 210 can be selected in groups to introduce an "off" bar on the reference band such as is shown and described in FIGS. 2A and 2B.

In an embodiment, a reading using an optical spectrum analyzer is taken when all the pixels (mirrors) on the DMD are "on" and then compared with the "off" state output (including the edge) to determine the spot of a wavelength. Because the dispersion of the reference optical signal band 230 is known, the edge can be selectively introduced to cut through a given wavelength and by comparing the "on" versus "off" output of the optical spectrum analyzer, the spot location can be determined. When a mirror is turned "off," the field on that mirror is "discarded." The power is the square of the sum of the field in the spot. Thus, when a spot is bisected by an edge, ½ of the field is discarded and the resulting power is ¼ (−6 dB) relative to the "all on" power. For example, when an "off" reading registers ¼ the power of an "on" reading, then it can be determined that the respective wavelength is cut exactly in half by the edge. For other locations of the wavelength, the orientation of the edge relative to the spot orientation needs to be known. The data can be collected using various optical spectrum analyzer sweeps and can then be analyzed to determine the exact spot size.

Derivation

Using the 'on' and 'off' bars (groups of mirrors on the DMD) the boundaries (in pixels) of the bars can be determined. The horizontal and vertical bars can be labeled as:

$X_a$ & $X_b$ for the vertical bar and $Y_c$ & $Y_d$ for the horizontal bar

Comparing the 'all on' data with the data collected after introducing the 'off' bars, the wavelengths that are at 6 dB below the 'all on' spectrum can be identified. These wavelengths are labeled as:

$\lambda_a$ & $\lambda_b$ for $X_a$ & $X_b$ and $\lambda_c$ & $\lambda_d$ for $Y_c$ & $Y_d$ respectively Our assumption was that λ varies linearly with the position so that:

$$\lambda = \alpha + \beta \cdot x \text{ and } \lambda = \gamma + \delta \cdot y \qquad \text{EQS. \#1 \& \#2}$$

For each axis we now have two equations and two unknowns:

$$\lambda_a = \alpha + \beta \cdot x_a \qquad \text{EQ. \#3a}$$

$$\lambda_c = \gamma + \delta \cdot y_c \qquad \text{EQ. \#3b}$$

$$\lambda_b = \alpha + \beta \cdot x_b \qquad \text{EQ. \#3c and}$$

$$\lambda_d = \gamma + \delta \cdot y_d \qquad \text{EQ. \#3d}$$

subtracting the first from the second gives:

$$\lambda_b - \lambda_a = (\alpha + \beta \cdot x_b) - (\alpha + \beta \cdot x_a) \text{ and } \lambda_d - \lambda_c = (\gamma + \delta \cdot y_d) - (\gamma + \delta \cdot y_c)$$

$$\lambda_b - \lambda_a = \beta \cdot x_b - \beta \cdot x_a \text{ and } \lambda_d - \lambda_c = \delta \cdot y_d - \delta \cdot y_c$$

solving for β and δ yields:

$$\beta = \frac{\lambda_b - \lambda_a}{x_b - x_a} \text{ and } \delta = \frac{\lambda_d - \lambda_c}{y_d - y_c} \qquad \text{EQS. \#4 \& \#5}$$

substituting back into the first equations (3a & 3c) we have:

$$\lambda_a = \alpha + \frac{\lambda_b - \lambda_a}{x_b - x_a} \cdot x_a \text{ and } \lambda_c = \gamma + \frac{\lambda_d - \lambda_c}{y_d - y_c} \cdot y_c$$

solving for α and γ yields:

$$\alpha = \frac{(x_b \cdot \lambda_a - x_a \cdot \lambda_b)}{(x_b - x_a)} \text{ and } \gamma = \frac{(y_d \cdot \lambda_c - y_c \cdot \lambda_d)}{(y_d - y_c)} \quad \text{EQS. 6 \& 7}$$

We have an expression for λ in terms of x (EQ 1) and in terms of y (EQ 2). Equating:

$$\alpha + \beta \cdot x = \gamma + \delta \cdot y$$

solving for y:

$$y = \left(\frac{\beta}{\delta}\right) \cdot x + \left[\frac{(\alpha - \gamma)}{\delta}\right]$$

which has the form Y=M·X+B

Therefore:

$$M = \frac{\left(\frac{\lambda_b - \lambda_a}{x_b - x_a}\right)}{\left(\frac{\lambda_d - \lambda_c}{y_d - y_c}\right)} \quad \text{EQS. 8 \& 9}$$

and $$B = \frac{\left[\frac{(x_b \cdot \lambda_a - x_a \cdot \lambda_b)}{x_b - x_a}\right] - \left[\frac{(y_d \cdot \lambda_c - y_c \cdot \lambda_d)}{(y_d - y_c)}\right]}{\left(\frac{\lambda_d - \lambda_c}{y_d - y_c}\right)}$$

or $$M = \left(\frac{\lambda_b - \lambda_a}{x_b - x_a}\right) \cdot \left(\frac{y_d - y_c}{\lambda_d - \lambda_c}\right)$$

and $$B = \left(\frac{y_d - y_c}{\lambda_d - \lambda_c}\right) \cdot \left[\frac{(x_b \cdot \lambda_a - x_a \cdot \lambda_b)}{(x_b - x_a)} - \frac{(y_d \cdot \lambda_c - y_c \cdot \lambda_d)}{(y_d - y_c)}\right]$$

We can determine the angle from M since: tan(θ)=M

Result

We now have all the equations we need:

$$Y = \left(\frac{\lambda_b - \lambda_a}{x_b - x_a}\right) \cdot \left(\frac{y_d - y_c}{\lambda_d - \lambda_c}\right) \cdot X + \left(\frac{y_d - y_c}{\lambda_d - \lambda_c}\right) \cdot \quad \text{EQS. 10, 11 \& 12}$$

$$\left[\frac{(x_b \cdot \lambda_a - x_a \cdot \lambda_b)}{(x_b - x_a)} - \frac{(y_d \cdot \lambda_c - y_c \cdot \lambda_d)}{(y_d - y_c)}\right]$$

and $$\lambda = \left(\frac{\lambda_b - \lambda_a}{x_b - x_a}\right) \cdot x + \left[\frac{(x_b \cdot \lambda_a - x_a \cdot \lambda_b)}{x_b - x_a}\right]$$

or $$\lambda = \left(\frac{\lambda_d - \lambda_c}{y_d - y_c}\right) \cdot y + \left[\frac{(y_d \cdot \lambda_c - y_c \cdot \lambda_d)}{(y_d - y_c)}\right]$$

With this result we can determine a constant that represents distance on the DMD surface for a given Δλ. By inspection we see that:

$$\Delta d = \Delta \lambda \cdot \gamma$$

where $$\gamma = \frac{x_b - x_a}{\lambda_b - \lambda_a} \cdot \sqrt{2 \cdot 13.8 \cdot \mu m}$$

or $$\gamma = \frac{y_d - y_c}{\lambda_d - \lambda_c} \cdot \sqrt{2 \cdot 13.8 \cdot \mu m}$$

These two results are nearly the same if the band is near 45°.

Figure 3:
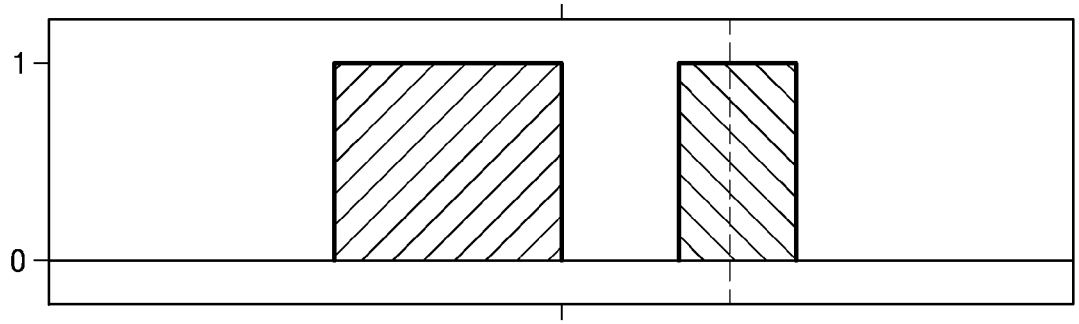
FIG. 3 illustrates an example of determining dispersion orientation of an optical band.

Modification of Bars to Determine Orientation:

FIG. 3 illustrates an example of determining dispersion orientation of an optical band according to an embodiment of the present invention. It is possible to modify the bars so that the dispersion orientation can be determine from measurement sweeps of the optical signal processor. In an embodiment, two sweeps of the optical signal processor are taken and the results are shown in FIG. 3. In the present example, both the vertical and horizontal bar are turned "on" the first half of the bar, turned "off" the next fourth of the bar, and turned "on" for the remaining fourth of the bar. The "on" state is represented by "1" and the "off" state is represented by "0." Because the bar as shown is asymmetric, the orietation of the dispersion line can be determined by the two extra edges.

Spot Size Calculation

When an "edge" or on/off boundary is introduced on the DMD 210 that cuts across the image of a broadband source dispersed by the grating 106, information about the spot size at the DMD 210 can be determined. Generally, when a known reference band is projected on the DMD, the spot size, shape and orientation of each λ is typically the same. The power envelope of the spot is a generalized 2D Gaussoid.

In the present example, the 45 degree edge through the reference band 230 on the DMD 210 is considered a straight line. However, the actual edge looks like a sawtooth due to the shape and alignment of mirrors on the DMD. Because the size of the mirrors on the DMD is very small, considering the sawtooth edge as a straight line introduces only a small error. When mirrors on the DMD are turned "off," typically the field of the "off" state pixels (mirrors) is negligible relative to the signal level of the reference band. The field of each pixel (mirror) of the DMD is discarded in the "off" state, however, the power remains on the pixel. This power can be measured to determine the "off" state power returned by the DMD when an edge is introduced on any spot of the reference band.

Derivation

According to embodiments described herein, a reference optical signal band may be used to determine the spot size of a given wavelength. As stated herein, the spot size, shape and orientation of each λ is typically the same in the reference optical signal. The power envelope of the spot in the reference optical signal is typically generalized 2D Gaussoid. As the optical signal traverses the grating and focusing optics, the spot in general will no longer be circular and will turn elliptic. The radii of the Gaussoid of the reference optical signal are perpendicular and parallel to the dispersion direction. The radii do not lie at some odd angle relative to the dispersion direction.

Typically, an edge at 45° on the surface of the DMD is considered a straight line, but the edge is actually a sawtooth, which in the described embodiments introduces a negligible error in the calculations. The contribution of the reflected light of the "off" state pixels is negligible for the reference signal level. When individual mirrors on the surface of the DMD are switched off, the field (not power), that strikes the pixels on the DMD, is discarded. This helps in determining the power returned by introducing an edge somewhere in the spot. The reading on an optical spectrum analyzer relative to an "all pixels on" reading represents the spot of some particular wavelength cut by the right amount to give the return shown. For example, for the ¼ power return, the wavelength spot is cut exactly in half. For readings other than the bisected-spot or half-spot reading, the orientation of the edge relative to the spot orientation needs to be known. The half-spot reading provides a significant amount of information from a single optical spectrum analyzer sweep. The equation of a normalized Gaussoid distribution is given by:

$$G(x, y) = \left(\frac{1}{2\cdot\pi\cdot\sigma_x\cdot\sigma_y}\right)\cdot\exp\left[-\frac{1}{2}\cdot\left[\left(\frac{x}{\sigma_x}\right)^2 + \left(\frac{y}{\sigma_y}\right)^2\right]\right]$$

$$\text{Let } A = \left(\frac{1}{2\cdot\pi\cdot\sigma_x\cdot\sigma_y}\right)$$

Where the term in front is just a normalization constant and the sigma's are the standard deviation in x and y. We now introduce an edge such that:

$$G\_edge(x, y) = \left(\frac{1}{2\cdot\pi\cdot\sigma_x\sigma_y}\right)\cdot\exp\left[-\frac{1}{2}\cdot\left[\left(\frac{x}{\sigma_x}\right)^2 + \left(\frac{y}{\sigma_y}\right)^2\right]\right]$$

if $y \leq (m - x + b)$ and 0 if $y > (m \cdot x + b)$

This distribution cannot be integrated directly to obtain the total field. The integral in x, y has no general closed form. There are three special cases:
1) b=0. In this case, a line passes through the origin. By symmetry, this is half of the integral over all x, y.
2) m=0. This is a horizontal line at y=b.
3) m=undefined and b does not exist. This is a vertical line at x=c.

Cases 2 and 3 can be integrated and evaluated. In particular, cases 2 is given as:

$$\int_{-\infty}^{b}\int_{-\infty}^{\infty}\left(\frac{1}{2\cdot\pi\cdot\sigma_x\sigma_y}\right)\cdot\exp\left[-\frac{1}{2}\cdot\left[\left(\frac{x}{\sigma_x}\right)^2 + \left(\frac{y}{\sigma_y}\right)^2\right]\right]dxdy$$

Let $$u = \frac{x}{\sigma_x} \text{ and } v = \frac{y}{\sigma_y}$$

So that $dx=\sigma_x\cdot du$, $dy=\sigma_y\cdot dv$ and $$\beta = \frac{b}{\sigma_y}$$

Now we have:

$$\int_{-\infty}^{\beta}\int_{-\infty}^{\infty}\left(\frac{1}{2\cdot\pi\cdot\sigma_x\sigma_y}\right)\cdot\exp\left[-\frac{1}{2}\cdot(u^2+v^2)\right]\cdot\sigma_x\cdot\sigma_y dudv$$

NOTE: The sigma's cancel

The indefinite integral yields $$\frac{1}{4}\cdot erf\left(\frac{v}{\sqrt{2}}\right)\cdot erf\left(\frac{u}{\sqrt{2}}\right)$$

Evaluating at all the limits gives:

$$\frac{1}{4}\cdot[erf(\beta)-(-1)]\cdot[1-(-1)] = \frac{1}{2}\cdot\left(erf\left(\frac{\beta}{\sqrt{2}}\right)+1\right)$$

since $$erf(-\infty) = -1$$

and $$erf(\infty) = 1$$

Substituting back for β we obtain:

$$\frac{1}{2}\cdot\left(erf\left(\frac{b}{\sigma_y\cdot\sqrt{2}}\right)+1\right)$$

Similarly for Cases 3 we get:

$$\frac{1}{2}\cdot\left(erf\left(\frac{c}{\sigma_x\cdot\sqrt{2}}\right)+1\right)$$

This suggests that an explicit answer for all other cases can be obtained because the substitution to u, v gives a symmetric (circular) 2D Gaussian. Further, the transform to u, v is just a scaling and the line (y=mx+b) transform to a line. By rotational symmetry, a rotated coordinate system u', v' can be chosen such that the transformed (u, v) line that represents the edge at (y=mx+b) is now just a vertical line at u'=c' (or a horizontal line can also be chosen). Therefore the closed form for all the cases is just:

$$\frac{1}{2}\cdot\left(erf\left(\frac{c'}{\sqrt{2}}\right)+1\right)$$

Now, c' needs to be determined. Substituting for x and y in our equation we have a line at:

$$y = m\cdot x + b \rightarrow$$

$$\sigma_y\cdot v = m\cdot\sigma_x\cdot u + b \rightarrow$$

-continued $$v = \left(m \cdot \frac{\sigma_x}{\sigma_y}\right) \cdot u + \left(\frac{b}{\sigma_y}\right)$$

so that in the u, v plane:

$$v = \mu \cdot u + \beta$$

where $$\mu = m \cdot \frac{\sigma_x}{\sigma_y}$$

and $$\beta = \frac{b}{\sigma_y}$$

Figure 4:
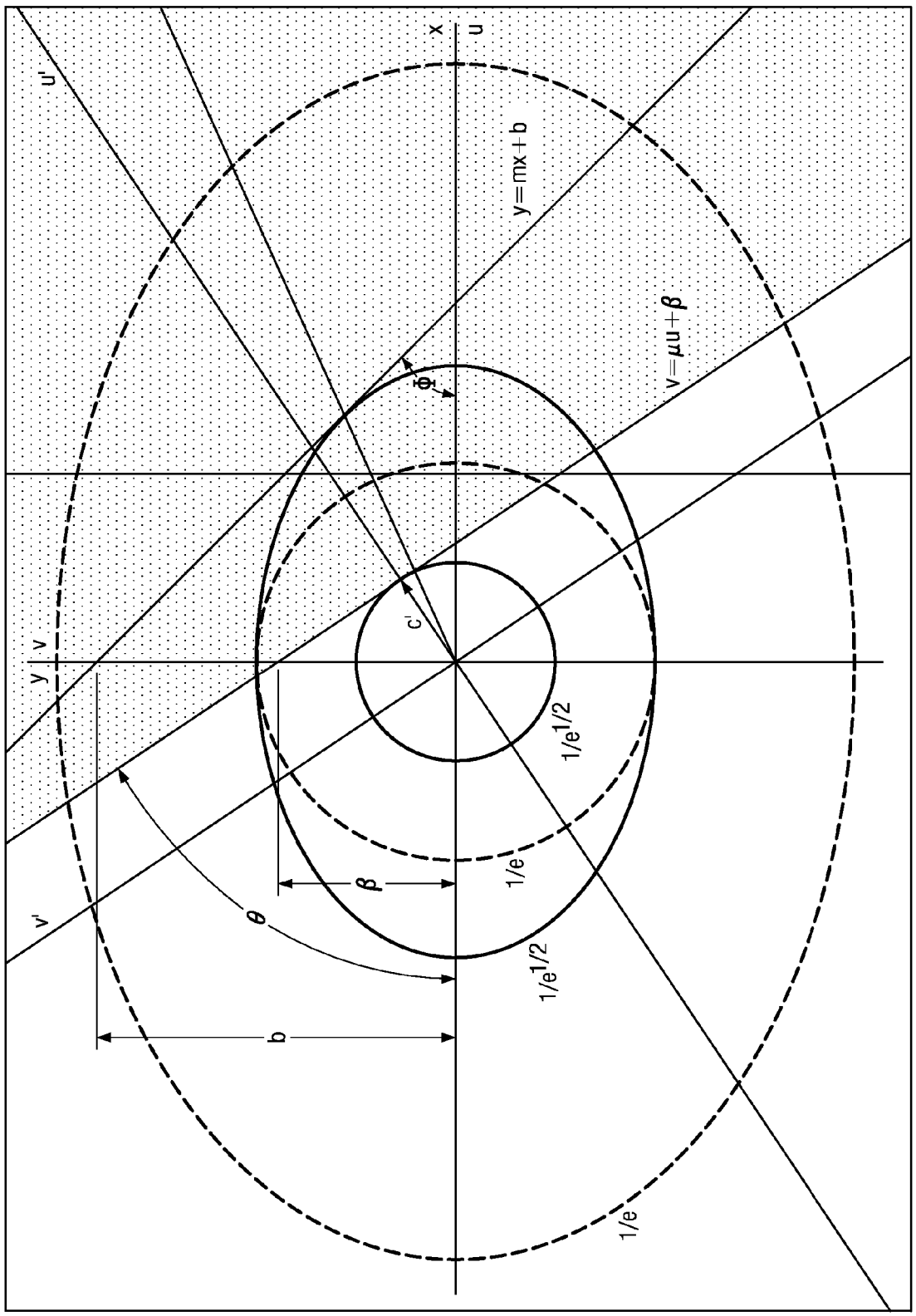
FIG. 4 illustrates an exemplary geometry of the spot of the reference optical signal; according to an embodiment of the present invention.

FIG. 4 illustrates the geometry of a wavelength spot of the reference optical signal according to an embodiment of the present invention. Note that the perpendicular distance for the origin to the edge is c'. Thus, by given geometry, $\tan(\theta)$ is $\mu$ and c' is given by:

$$c' = \beta \cdot \cos(\theta) \text{ but } \cos(\theta) = \frac{1}{\sqrt{\tan(\theta)^2 + 1}} = \frac{1}{\sqrt{\mu^2 + 1}}$$

Therefore:

$$c' = \frac{\beta}{\sqrt{\mu^2 + 1}}$$

substituting back gives $$c' = \frac{\left(\frac{b}{\sigma_y}\right)}{\sqrt{\left(m \frac{\sigma_x}{\sigma_y}\right)^2 + 1}}$$

Therefore, integration of a Gaussiod with an edge is just:

$$\frac{1}{2} \cdot \left[\text{erf}\left[\frac{b}{\sqrt{2 \cdot [(m \cdot \sigma_x)^2 + \sigma_y^2]}}\right] + 1\right]$$

Application

In an embodiment, a broadband reference source is introduced into the system and a spectrum is gathered with all the mirrors on the DMD 114, 210 in the "on" state. Two edges are introduced, one perpendicular to the dispersion direction, and one at 45° to the dispersion direction and the respective spectra are taken. If a read parallel to the dispersion direction is taken then because all spots react the same, several reads will be required to determine the non-dispersion spot width. For purposes of data calculation, the dispersion direction is chosen to be along y-axis. From the perpendicular edge spectrum, the distance from the center of the Power Gaussoid to the 1/e power point can be determined. In the field Gaussoid, this will be $\sigma_y$.

The ¼ power point (i.e. the ½ field) occurs when the Gaussoid is exactly bisected. As stated herein, the relationship between distance on the DMD surface and wavelength is known. The dispersion width of the spot can be deduced by determining the width in $\Delta\lambda$. This is equivalent to slicing a single wavelength spot in half (¼ power) and then sliding it over some distance 'd' in the dispersion direction until the return power is equal to a Gaussoid with an edge at $y=\sigma_y$. The value of the field needs to be determined at that point:

For a horizontal edge at y=b:

$$\frac{1}{2} \cdot \left(\text{erf}\left(\frac{c}{\sigma_y \cdot \sqrt{2}}\right) + 1\right) = \text{Total\_Field}$$

So we set $b=\sigma_y$.

$$\frac{1}{2} \cdot \left(\text{erf}\left(\frac{\sigma_y}{\sigma_y \cdot \sqrt{2}}\right) + 1\right) \rightarrow F := \frac{1}{2} \cdot \left(\text{erf}\left(\frac{1}{\sqrt{2}}\right) + 1\right)$$

So that the Field is: F=0.8413.

And the Power is: $P := F^2$ thus, P=0.7079.

In the given spectrum of the perpendicular edge, we look for the $\lambda$ whose power is ¼ of its all "on" value (i.e. value with all the mirrors/pixels "on") and the $\lambda$ whose power is P of its all "on" value.

Let us label these $\lambda_{o\_perp}$ and $\lambda_{\sigma\_y}$ so that $\Delta\lambda_{perp} = |\lambda_{o\_perp} - \lambda_{\sigma\_y}|$.

Therefore, $\sigma_y = \Delta\lambda_{perp} \cdot \gamma$.

where $\gamma$ is just a constant determined during the band find algorithm that converts wavelength difference to distance on the DMD surface. To determine b, the distance between the two $\lambda$'s that represent the ¼ power and the P normalized return, take the 45° edge spectrum data. From that value and $\sigma_y$ we can determine $\sigma_x$.

Label these wavelengths as: $\lambda_{o\_45}$ and $\lambda_b$

So that $\Delta\lambda_{45} = |\lambda_{o\_45} - \lambda_b|$

We now find $b = \Delta\lambda_{45} \cdot K$

Now we return to the Equation.

$$\frac{1}{2} \cdot \left(\text{erf}\left(\frac{c'}{\sqrt{2}}\right) + 1\right)$$

We know that at the chosen Power level P, c'=1.

Therefore from our previous derivation:

$$c' = 1 = \frac{b}{\sqrt{(m \cdot \sigma_x)^2 + \sigma_y^2}}$$

Then solve for $$\sigma_x = \frac{\sqrt{b^2 - \sigma_y^2}}{|m|}$$

Now at 45° m=−1.

so that we have: $\sigma_x = \sqrt{b^2 - \sigma_y^2}$.

APPLICATION EXAMPLE

In the present example, let:

$\sigma_x := 3 \; \sigma_y := 2$

Using the given equation, the intercept is chosen as:

$b := \sqrt{\sigma_x^2 + \sigma_y^2}$

The normalization constant is defined as:

$$A := \frac{1}{2 \cdot \pi \cdot \sigma_x \cdot \sigma_y}$$

This means that the "all on" Power is 1, thus:

$$P_{on} := \left[ \int_{-\infty}^{\infty} \int_{-\infty}^{\infty} A \cdot e^{-\frac{1}{2}\left[\left(\frac{x}{\sigma}\right)^2 + \left(\frac{y}{\sigma_y}\right)^2\right]} dx dy \right]^2 \quad P_{on} = 1$$

Let the slope be for −45°: m:=−1

The Gaussiod cut by an edge is defined as:

$$G_{edge}(x, y) := \begin{cases} 0 & \text{if } y \geq m \cdot x + b \\ \left[A \cdot e^{-\frac{1}{2}\left[\left(\frac{x}{\sigma_x}\right)^2 + \left(\frac{y}{\sigma_y}\right)^2\right]}\right] & \text{otherwise} \end{cases}$$

The power is the square of the Field being returned which is:

$$\left( \int_{-\infty}^{\infty} \int_{-\infty}^{\infty} G_{edge}(x, y) dx dy \right)^2 = 0.7079$$

APPLICATION DATA EXAMPLE

From band find data example it given that:

$\Delta\lambda_{perp} := 0.15 \cdot nm \; \Delta\lambda_{45} := 0.26 \; nm$ (average)

It was also determined that:

$$K := \frac{\sqrt{2 \cdot (13.8 \cdot \mu m)}}{0.131 \cdot nm}$$

(i.e.—The diagonal distance across a mirror divided by the $\Delta\lambda$ across one diagonal as determined by the band find algorithm.)

Using the given equation:

$\sigma_y := \Delta\lambda_{perp} \cdot K$ and $b := \Delta\lambda_{45} \cdot k ==> \sigma_y = 22 \; \mu m$ and $b = 39 \; \mu m \; \sigma_x := \sqrt{b^2 - \sigma_y^2} --> \sigma_x = 32 \; \mu m$ These formulae can be used to determine specifically which pixels are illuminated by a given wavelength. For example, in a dense wave division multiplication application, these formulae can be used to determine specific pixels that control power in a given wavelength (channel). Further, within the given wavelength (channel), the field on each pixel is characterized by the Gaussoid equation described herein. Thus, for the given channel, turning off a pixel P at (x, y) reduces the power in that channel by F(n, P), where "n" defines the location of the center of the Gaussoid information and "P" defines the (x, y) pixel location relative to that center.

One skilled in the art will appreciate that the equations described here in can be processed using various methods (e.g., by a processing system coupled to the optical signal processing system or the like) as described herein to determine the characteristics of optical signals. A few preferred embodiments have been described in detail herein. It is to be understood that the scope of the invention also comprehends embodiments different from those described, yet within the scope of the claims. Words of inclusion are to be interpreted as nonexhaustive in considering the scope of the invention. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The section headings in this application are provided for consistency with the parts of an application suggested under 37 CFR 1.77 or otherwise to provide organizational cues. These headings shall not limit or characterize the invention(s) set out in any patent claims that may issue from this application. Specifically and by way of example, although the headings refer to a "Field of the Invention," the claims should not be limited by the language chosen under this heading to describe the so-called field of the invention. Further, a description of a technology in the "Description of Related Art" is not be construed as an admission that technology is prior art to the present application. Neither is the "Summary of the Invention" to be considered as a characterization of the invention(s) set forth in the claims to this application. Further, the reference in these headings to "Invention" in the singular should not be used to argue that there is a single point of novelty claimed in this application. Multiple inventions may be set forth according to the limitations of the multiple claims associated with this patent specification, and the claims accordingly define the invention(s) that are protected thereby. In all instances, the scope of the claims shall be considered on their own merits in light of the specification but should not be constrained by the headings included in this application.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

While particular embodiments of the present invention have been shown and described, it will be clear to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method for determining one or more of location and orientation of an optical signal band projected on a spatial light modulator, the spatial light modulator comprising a plurality of pixels and the optical signal band including one or more wavelengths, the method comprising:
   measuring a first output of the spatial light modulator;
   selectively turning off one or more groups of pixels of the plurality of pixels;
   measuring a second output of the spatial light modulator corresponding to the selection of the one or more groups of pixels that are turned off; and
   determining the one or more of the location and the orientation of the optical signal band by comparing the first output with the second output corresponding to each selection of the one or more groups of pixels that are turned off.

2. A method according to claim 1, further comprising:
   determining spot sizes of the one or more wavelengths using the one or more of the location and the orientation of the optical signal band.

3. A method according to claim 1, wherein the optical signal band is dispersed by a grating.

4. A method according to claim 1, wherein the first output of the spatial light modulator is measured with substantially all the pixels of the plurality of pixels being turned on.

5. A method according to claim 1, wherein the spatial light modulator is a digital micromirror display system.

6. A method according to claim 1, wherein the one or more groups of pixels are selected using a binary search algorithm.

7. A method according to claim 1, wherein the optical signal band is projected at an angle of forty-five degrees relative to the plurality of pixels of the spatial light modulator.

8. A method according to claim 1, wherein the selected one or more groups of pixels form one or more horizontal bars of pixels that are turned off on the spatial light modulator.

9. A method according to claim 8, wherein the one or more horizontal bars of pixels that are turned off represent at least two edges of the optical signal band within which substantially all the pixels corresponding to the optical signal band are turned "on".

10. A method according to claim 9, wherein
    a first edge is within the proximity of a first wavelength of the optical signal band; and
    a second edge is within the proximity of a last wavelength of the optical signal band.

11. A method according to claim 1, wherein the selected one or more groups of pixels form one or more vertical bars of pixels that are turned off on the spatial light modulator.

12. A method according to claim 11, wherein the one or more vertical bars of pixels that are turned off represent at least two edges of the optical signal band with which substantially all the pixels corresponding to the optical signal band are turned 'on'.

13. A method according to claim 12, wherein
    a first edge is within the proximity of a first wavelength of the optical signal band; and
    a second edge is within the proximity of a last wavelength of the optical signal band.

14. A method according to claim 1, wherein the selected one or more groups of pixels form one or more diagonal bars of pixels that are turned off on the spatial light modulator.

15. A method according to claim 14, wherein the one or more diagonal bars of pixels that are turned off represent at least two edges of the optical signal band within which substantially all the pixels corresponding to the optical signal band are turned "on".

16. A method according to claim 15, wherein
    a first edge is within the proximity of a first wavelength of the optical signal band; and
    a second edge is within the proximity of a last wavelength of the optical signal band.

17. An apparatus comprising:
    a spatial light modulator comprising a plurality of pixels wherein an optical signal band is projected on the spatial light modulator and the optical signal band includes one or more wavelengths; and
    an optical signal processor coupled to the spatial light modulator and configured to measure a first output of the spatial light modulator;
        selectively turn off one or more groups of pixels of the plurality of pixels;
        measure a second output of the spatial light modulator corresponding to each selection of the one or more groups of pixels that are turned off; and determine the one or more of location and orientation of the optical signal band by comparing the first output with the second output of the spatial light modulator corresponding to each selection of the one or more groups of pixels that are turned off.

18. An apparatus according to claim 17, wherein the optical signal processor is further configured to determine spot sizes of the one or more wavelengths using the one or more of the location and the orientation of the optical signal band.

19. An apparatus according to claim 17, further comprising a grating coupled to the spatial light modulator and configured to disperse the optical signal band.

20. An apparatus according to claim 17, wherein the optical signal processor is further configured to measure the first output of the spatial light modulator with substantially all the pixels of the plurality of pixels being turned on.

21. An apparatus according to claim 17, wherein the spatial light modulator is a digital micromirror display system.

22. An apparatus according to claim 17, wherein the optical signal processor is further configured to select the one or more groups of pixels using a binary search algorithm.

23. An apparatus according to claim 17, wherein the optical signal band is projected at an angle of forty-five degrees relative to the plurality of pixels of the spatial light modulator.

24. An apparatus according to claim 17, wherein the selected one or more groups of pixels form one or more horizontal bars of pixels that are turned off on the spatial light modulator.

25. An apparatus according to claim 24, wherein the one or more horizontal bars of pixels that are turned off represent at least two edges of the optical signal band with which substantially all the pixels corresponding to the optical signal band are turned "on".

26. An apparatus according to claim 25, wherein
a first edge is within the proximity of a first wavelength of the optical signal band; and
a second edge is within the proximity of a last wavelength of the optical signal band.

27. An apparatus according to claim 17, wherein the selected one or more groups of pixels form one or more vertical bars of pixels that are turned off on the spatial light modulator.

28. An apparatus according to claim 27, wherein the one or more vertical bars of pixels that are turned off represent at least two edges of the optical signal band within which substantially all the pixels corresponding to the optical signal band are turned "on".

29. An apparatus according to claim 28, wherein
a first edge is within the proximity of a first wavelength of the optical signal band; and
a second edge is within the proximity of a last wavelength of the optical signal band.

30. An apparatus according to claim 17, wherein the selected one or more groups of pixels form one or more diagonal bars of pixels that are turned off on the spatial light modulator.

31. An apparatus according to claim 30, wherein the one or more diagonal bars of pixels that are turned off represent at least two edges of the optical signal band within which substantially all the pixels corresponding to the optical signal band are turned "on".

32. An apparatus according to claim 31, wherein
a first edge is within the proximity of a first wavelength of the optical signal band; and
a second edge is within the proximity of a last wavelength of the optical signal band.

* * * * *

UNITED STATES PATENT AND TRADEMARK OFFICE
CERTIFICATE OF CORRECTION

PATENT NO. : 7,652,657 B2  Page 1 of 1
APPLICATION NO. : 11/610394
DATED : January 26, 2010
INVENTOR(S) : Benjamin Lowell Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 619 days.

Signed and Sealed this

Twenty-eighth Day of December, 2010

David J. Kappos
*Director of the United States Patent and Trademark Office*